Jan. 27, 1970   C. B. METCALF, JR   3,491,474
ELECTRIC TRAWL NET
Filed April 4, 1968
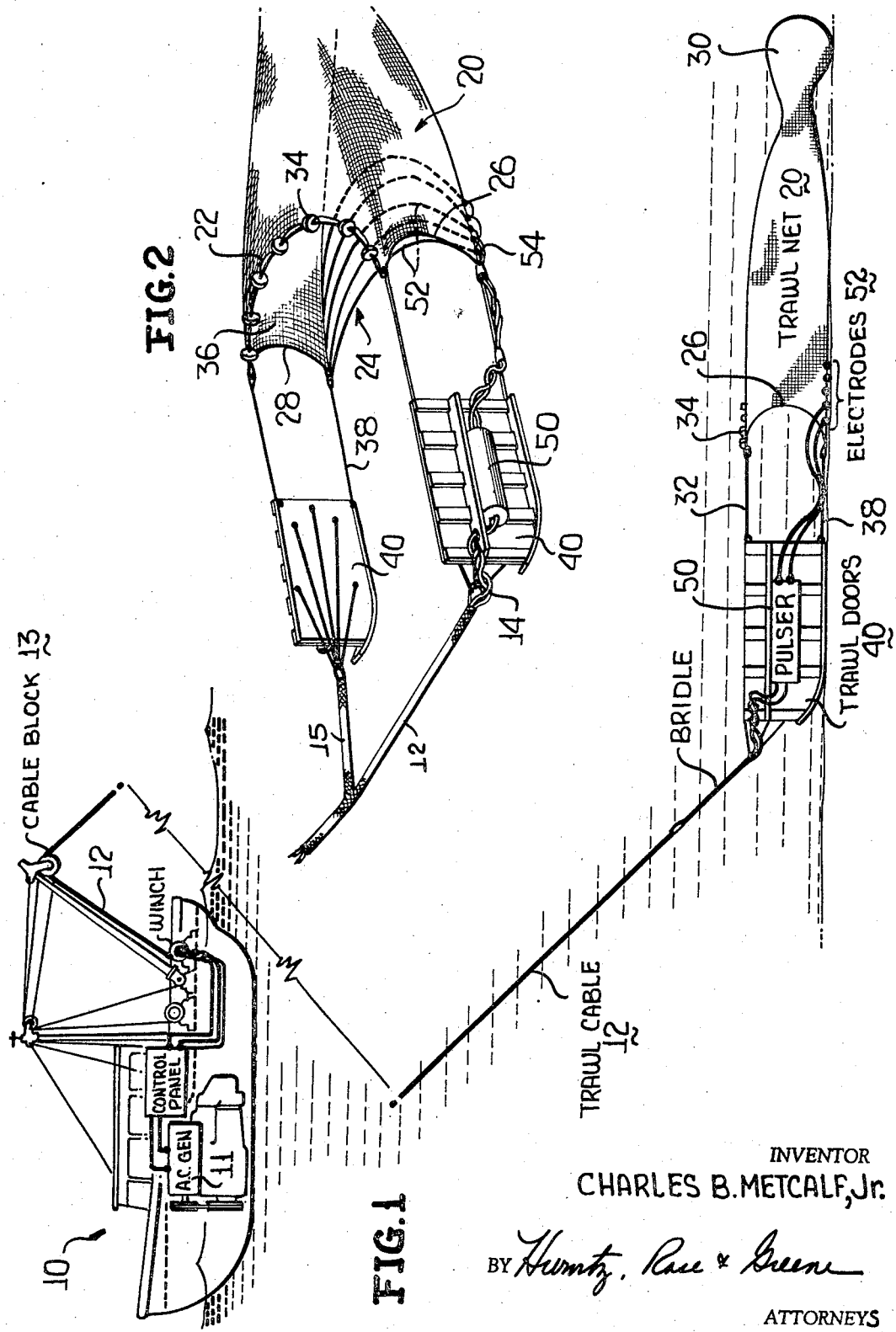
INVENTOR
CHARLES B. METCALF, Jr.
BY Hurntz, Rose & Greene
ATTORNEYS

# United States Patent Office 3,491,474
Patented Jan. 27, 1970

3,491,474
ELECTRIC TRAWL NET
Charles B. Metcalf, Jr., 3601 Swan Lane,
Pensacola, Fla. 32504
Filed Apr. 4, 1968, Ser. No. 718,771
Int. Cl. A01k 73/02
U.S. Cl. 43—9          5 Claims

ABSTRACT OF THE DISCLOSURE

A system for fishing for shrimp when located in sediment layers under water. The shrimp are subjected to electric fields produced by electrodes of alternate polarity attached to—and extending transversely across the open mouth of—a trawl net. AC voltage is generated aboard a trawler and there converted to DC. The trawl net is dragged by a steel cable which carries conductors internally thereof for conveying the DC to a pulse generator. A section of steel cable is spliced to the main cable, to provide the required double line traction.

BACKGROUND OF THE INVENTION

It is known that at certain times of the day, and at certain seasons of the year, shrimp burrow into sediment layers and lie quiescent, and therefore cannot be captured by conventional trawling methods. It is also known that shrimp may be caused to emerge from the sediment in which they are immersed, by applying an electric field to the sediment. One manner of dragging a trawl net and of applying a voltage gradient to the sediment over which the trawl is dragged, is to transmit AC power from a ship's generator to an electronic pulse generator attached to the trawl door. Here the AC is converted to DC, stored in a capacitor bank, and discharged through an electrode array, to create a pulsed field immediately in front of the trawl. The trawl itself is dragged by means of a steel cable, and the AC current supplied to the pulse generator by a separate electrical cable. In an alternate scheme, the use of a separate electrical cable is avoided by supplying a battery power supply for the pulse generator, directly at the latter. This has the disadvantage that battery availability time is short, in that the battery must be recharged at frequen intervals and for this purpose the trawl must be hauled in.

It is known that fairly low level pulsed fields, in the range of a few volts, but at considerable current, to underwater shrimp beds in which shrimp have burrowed, cause the shrimp to move out of their burrows and into the water where they can be captured by a trawl. Many studies have been made of the optimum pulse power, duration and pulse repetition rate required to generate a scare response in the shrimp, rather than electronarcosis or electrotaxis. Various electrode arrangements have been attempted. For example, U.S. Patent No. 3,312,011 to Wathne et al., deals with the latter subject; and in particular teaches that the requisite electrodes may be attached to the trawl. A suitable arrangement of electrodes is also there taught, upon which applicant has improved.

SUMMARY OF THE INVENTION

According to the present invention, a steel clad flexible electrical cable is utilized directly to serve as a tow line for dragging a trawl and also to supply electrical current thereto. The current is supplied as DC, which reduces the complexity and bulk of the electrical equipment which must be carried by the trawl itself, and the heat which must be dissipated by that equipment. There extends only one cable from the ship to the trawl, which simplifies pulling in, unshipping and dragging of the trawl, yet no need exists for battery operation. The present invention also teaches a form of electrode arrangement, in which five electrodes of alternate polarity extend completely across the opening of the trawl, each lying on or near the bottom, so that fields of alternate polarity are applied to any individual shrimp as the trawl is dragged along.

DESCRIPTION OF THE DRAWINGS

The above and still further objects, features and attendant advantages of the present invention will become apparent from a consideration of the following detailed description of a preferred embodiment thereof, especially when taken in conjunction with the accompanying drawings, in which:

FIGURE 1 is a view in side elevation according to the invention; and

FIGURE 2 is a view in perspective of a trawl net and cables, corresponding to FIGURE 1.

DESCRIPTION OF THE PREFERRED EMBODIMENT

Reference numeral 10 identifies a trawling vessel, which contains an AC generator 11, driven from the ship's prime mover. The generator 11 provides current at 125 v. The output of generator 11 is supplied to a rectifier, which supplies DC voltage of about 125 v.

A steel covered cable 12 extends over a block 13 and down into the water. Specifically, the cover of the cable is a double reversed layer of galvanized steel armor, which in turn surrounds three (or more) insulated electrical conductors 14.

The cable is rated at 17,000 lbs. breaking strength and is thus capable of replacing standard trawling cable, while simultaneously serving as a conduit for electrical current.

Two tow lines are required to join the otter boards of a trawl to a towing vessel. The cable 12 provides one of these lines and a section of cable 15 may be spliced to the cable 12 to provide the second tow line.

The trawl itself includes a trawl net 20, having a generally wedge shaped top panel 22, and a similar bottom panel 24, both of which taper to the rear. Suitably shaped wing panels 26, 28 join the top and bottom panels 22, 24, and these terminate in a bag 30, constituting the cod end of the trawl. A headrope 32, equipped with floats 34 stretches over a front opening 36 of the trawl net 20, to maintain the net open in a vertical sense. A footrope 38 is stretched along the lower edge of opening 36. The ends of headrope 32 and footrope 38 are connected to otter boards 40, in a manner conventional per se. The otter boards 40 are then connected to the towing lines, in usual fashion.

Secured to that one of the otter boards 40 to which the electrical cable 14 proceeds is a sealed pulse generator 50. The latter contains only solid state devices and is pressure rated at 6,000 p.s.i.g. All components are encapsulated in a shock proof silica gel material.

The pulser 50 produces 5 p.p.s. at about 4–12 v. deliverable to the electrodes 52. About 5,000 watts of peak power is available. The electrodes are in the form of metallic conductors extending between the lower lead lines 54, each parallel to the others, but adjacent electrodes are connected to conductors 14 of opposite polarities. The electrodes drag along the bottom, and thereby provide a high intensity field at the shrimp burrows. As the trawl is dragged along, any given shrimp is subjected for a short time to pulses of one polarity and then to pulses of opposite polarity, and in toto to four sets of pulses. This fact is believed to contribute to the success achieved by the present system, but no direct and simple proof exists of this fact since no two tests can be conducted under precisely the same circumstances. Suffice it to state that the electrode system of the present invention has been tested in comparison with alternative electrode systems, and provides an increased shrimp yield.

The present invention enables use of only one cable, both for towing and for electrical current supply. A minimum of electrical components is maintained submerged, by supplying DC to the submerged pulser. More effective electrode arrangement is provided than has been available hitherto. Thereby, maintenance and handling requirements have been minimized, cost of equipment reduced, and economic effectiveness per installation in terms of shrimp catch has been enhanced.

While I have disclosed a preferred embodiment of my invention, it will be apparent that variation of the details of construction which have been illustrated and described may be resorted to without departing from the sipirit and scope of the invention.

I claim:
1. A trawl net for an underwater surface, comprising a bag having an open end,
   top and bottom panels secured to said open end and extending parallel to said underwater surface,
   side panels extending vertically between edges of said top and bottom panels to form a trawl opening,
   a pair of otter boards,
   headropes securing said panels to said otter boards,
   a pulse generator secured to one of said otter boards,
   means supplying only direct current to said pulse generator,
   said pulse generator including only components for converting said direct current to direct current pulses,
   a plurality of at least three electrodes secured across said trawl opening and located between said trawl opening and said otter boards,
   means connecting alternate ones of said electrodes to said pulse generator in opposite polarities,
   said electrodes extending each transversely of the direction of travel of said trawl along said surface and being spaced apart with respect to each other in the direction of travel of said otter boards,
   whereby a given point of said surface is subjected in succession to electrical fields of opposite polarity as said trawl traverses said point of said surface.

2. A system of electrical bottom trawling, comprising, aboard a ship,
   a source of alternating current and a rectifier for converting said alternating current to direct current,
   a trawl having an open end,
   a pulse generator secured to said trawl,
   said pulse generator being operative to convert said direct current to recurrent discrete pulses,
   electrodes secured to said trawl each extending across said trawl open end and said electrodes being spaced with respect to each other in the direction of travel of said trawl,
   means for applying said recurrent discrete pulses in alternately opposite polarities to adjacent ones of said electrodes, and
   an electrical cable connected between said rectifier and said pulse generator for conveying said direct current to said pulse generator,
   a tow line extending between said ship and said trawl,
   said tow line internally incorporating said electrical cable.

3. The combination according to claim 2 wherein the trawl is pulled in a direction by said tow line,
   said electrodes extending only transversely of said direction and spaced in said direction from each other,
   said electrodes subsisting in a common plane parallel to said bottom.

4. The combination according to claim 3, wherein at least three electrodes are provided, and
   wherein said cable includes a positive and a negative conductor, and
   means connecting said positive conductor only to alternate ones of said electrodes and said negative conductor to the remainder of said electrodes.

5. The combination according to claim 4 wherein the number of said electrodes is five.

References Cited

UNITED STATES PATENTS 3,415,001  12/1968  Ott et al. ---------- 43—17.1

WARNER H. CAMP, Primary Examiner

U.S. Cl. X.R.

43—17.1